(12) United States Patent
Wahl et al.

(10) Patent No.: US 10,618,726 B2
(45) Date of Patent: Apr. 14, 2020

(54) ELECTRONICS ASSEMBLY FOR WIRELESS TRANSMISSION OF AT LEAST ONE STATUS INFORMATION

(71) Applicant: SIGMA-ALDRICH INTERNATIONAL GMBH, St. Gallen (CH)

(72) Inventors: Fabian Wahl, Buchs (CH); Gerd Hayenga, Buchs (CH); Bastian Bachmann, Pfäffikon (CH); Samuel Schindler, Horgen (CH); Martin Meyer, Gladenbach (DE)

(73) Assignee: SIGMA-ALDRICH INTERNATIONAL GMBH, St. Gallen (CH)

( * ) Notice: Subject to any disclaimer, the term of this patent is extended or adjusted under 35 U.S.C. 154(b) by 0 days.

(21) Appl. No.: 15/836,126

(22) Filed: Dec. 8, 2017

(65) Prior Publication Data
US 2018/0162636 A1 Jun. 14, 2018

(30) Foreign Application Priority Data
Dec. 13, 2016 (EP) ..................................... 16203734

(51) Int. Cl.
*B65D 90/48* (2006.01)
*G01F 23/296* (2006.01)
(Continued)

(52) U.S. Cl.
CPC ............ *B65D 90/48* (2013.01); *G01F 23/00* (2013.01); *G01F 23/2962* (2013.01);
(Continued)

(58) Field of Classification Search
None
See application file for complete search history.

(56) References Cited

U.S. PATENT DOCUMENTS

| 4,908,606 A | * | 3/1990 | Kevonian | ............... | A45C 13/24 |
| | | | | | 340/426.18 |
| 5,126,719 A | * | 6/1992 | DeSorbo | ............ | G08B 13/1436 |
| | | | | | 340/539.1 |

(Continued)

FOREIGN PATENT DOCUMENTS

| CN | 205470874 U | 8/2016 |
| DE | 10 2005 023 300 A1 | 12/2005 |

(Continued)

OTHER PUBLICATIONS

European Search Report Corresponding to 16203734.5 dated Mar. 17, 2017.

(Continued)

*Primary Examiner* — Curtis J King
(74) *Attorney, Agent, or Firm* — Davis & Bujold, P.L.L.C.; Michael J. Bujold

(57) ABSTRACT

An electronics assembly for wireless transmission of at least one status information of an object comprises a motion sensor for detecting movement of the object. Upon detection of movement, the electronics assembly is set in a transport mode and, upon detection of an absence of a movement, the electronics assembly is set in a stationary mode. The electronics assembly is configured such that the wireless transmission of the at least one status information is effected only in the stationary mode.

5 Claims, 5 Drawing Sheets

Figure 1:
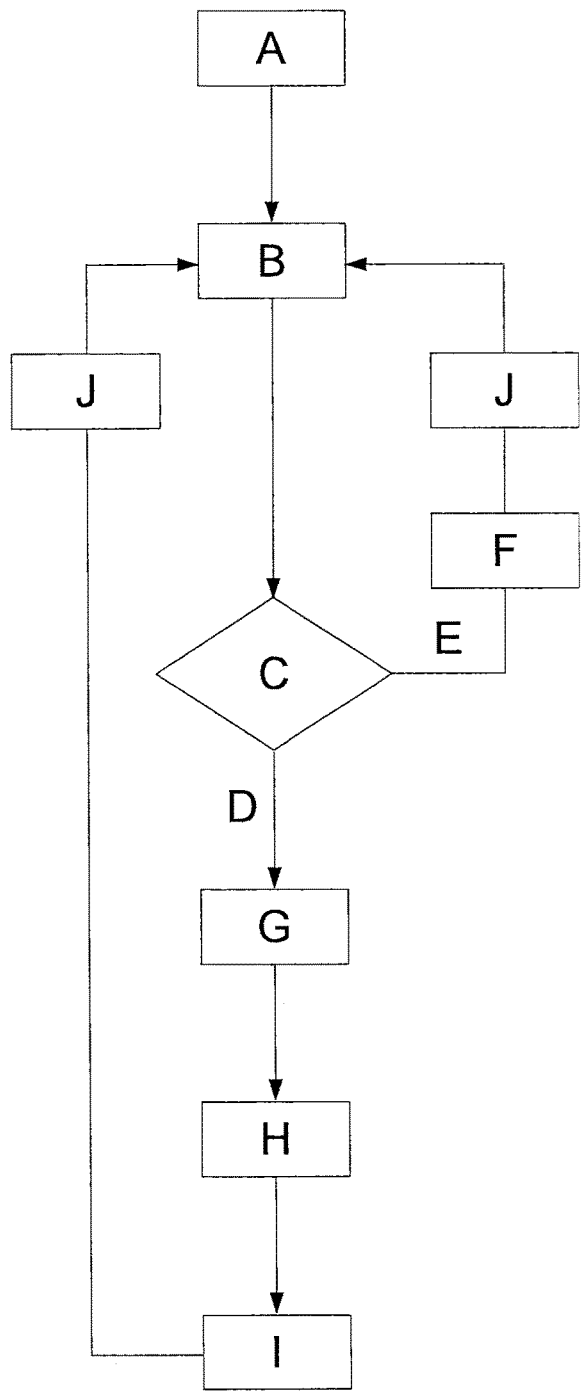

(51) Int. Cl.
| | |
|---|---|
| *G06F 1/3206* | (2019.01) |
| *G06Q 50/28* | (2012.01) |
| *G01F 23/00* | (2006.01) |
| *H04L 29/08* | (2006.01) |
| *G06Q 10/08* | (2012.01) |
| *G01S 5/00* | (2006.01) |

(52) U.S. Cl.
CPC ......... *G06F 1/3206* (2013.01); *G06Q 10/087* (2013.01); *G06Q 50/28* (2013.01); *H04L 67/12* (2013.01); *G01F 23/0007* (2013.01); *G01S 5/0027* (2013.01); *G06Q 10/0833* (2013.01)

(56) References Cited

U.S. PATENT DOCUMENTS

| | | | | |
|---|---|---|---|---|
| 6,628,237 | B1* | 9/2003 | Forster | B65D 25/205 340/572.7 |
| 6,720,865 | B1* | 4/2004 | Forster | B65D 25/205 235/375 |
| 7,038,585 | B2* | 5/2006 | Hall | B65D 7/00 220/200 |
| 7,312,702 | B1* | 12/2007 | Willms | G06Q 10/08 340/540 |
| 7,592,916 | B2* | 9/2009 | Staples | G06Q 10/08 340/539.13 |
| 7,663,497 | B2* | 2/2010 | Chishima | G01F 23/284 340/539.1 |
| 7,760,104 | B2* | 7/2010 | Asp | B65C 7/00 141/2 |
| 7,911,336 | B1* | 3/2011 | Hummer | G08B 21/12 340/12.22 |
| 8,238,196 | B2* | 8/2012 | Golparian | G01V 1/22 340/870.01 |
| 8,432,249 | B2* | 4/2013 | Bailey-VanKuren | A47G 19/2272 220/254.9 |
| 8,674,827 | B2* | 3/2014 | Hummer | G08B 21/12 340/426.19 |
| 9,082,102 | B2* | 7/2015 | Taylor | G01S 5/0205 |
| 9,232,290 | B2* | 1/2016 | Besay | H04R 1/028 |
| 9,628,434 | B2* | 4/2017 | Laidlaw | H04L 51/38 |
| 9,636,280 | B1* | 5/2017 | Althallab | A61J 9/008 |
| 9,842,449 | B1* | 12/2017 | Ruth | G07C 9/00896 |
| 2003/0011466 | A1* | 1/2003 | Samuel | A45C 13/24 340/5.73 |
| 2003/0227382 | A1* | 12/2003 | Breed | G06Q 20/203 340/539.13 |
| 2004/0124977 | A1* | 7/2004 | Biffar | G06Q 10/08 340/539.13 |
| 2004/0178880 | A1* | 9/2004 | Meyer | B60R 25/1004 340/5.22 |
| 2004/0183673 | A1* | 9/2004 | Nageli | G01S 5/0018 340/539.13 |
| 2005/0040944 | A1* | 2/2005 | Contestabile | G08B 21/0269 340/539.13 |
| 2005/0207141 | A1* | 9/2005 | Boesch | A47G 19/2227 362/101 |
| 2005/0232747 | A1* | 10/2005 | Brackmann | B60P 3/03 414/803 |
| 2006/0139147 | A1* | 6/2006 | Sterzinger | E05G 1/005 340/5.72 |
| 2007/0001855 | A1* | 1/2007 | Bohman | B65D 90/00 340/572.1 |
| 2007/0057818 | A1* | 3/2007 | Battista | G08G 1/20 340/988 |
| 2007/0083921 | A1* | 4/2007 | Parris | A45C 5/14 726/9 |
| 2007/0227913 | A1* | 10/2007 | Shoenfeld | E05B 47/0012 206/1.5 |
| 2008/0052044 | A1* | 2/2008 | Shoenfeld | E05B 65/52 702/188 |
| 2008/0100469 | A1* | 5/2008 | Goldburt | B65D 23/14 340/693.9 |
| 2008/0191867 | A1* | 8/2008 | Markovich | G07C 9/00912 340/539.13 |
| 2008/0231453 | A1* | 9/2008 | Corder | G06Q 10/08 340/572.1 |
| 2009/0040043 | A1 | 2/2009 | Rohr et al. | |
| 2009/0109040 | A1* | 4/2009 | MacLean, III | G21F 5/06 340/600 |
| 2009/0153358 | A1* | 6/2009 | Park | H01M 10/44 340/870.39 |
| 2009/0159614 | A1* | 6/2009 | Yacko | B05B 11/0054 222/129 |
| 2009/0189788 | A1* | 7/2009 | Faus | G08B 25/08 340/989 |
| 2010/0071572 | A1* | 3/2010 | Carroll | B30B 9/3007 100/229 A |
| 2010/0127855 | A1* | 5/2010 | Zucker | G08B 13/1445 340/540 |
| 2010/0251785 | A1* | 10/2010 | Zarei | B65D 90/00 70/58 |
| 2010/0300913 | A1* | 12/2010 | Goldburt | B65D 23/12 206/459.1 |
| 2011/0077909 | A1 | 3/2011 | Gregory et al. | |
| 2011/0140885 | A1* | 6/2011 | Hummer | G08B 21/12 340/539.13 |
| 2013/0002443 | A1 | 1/2013 | Breed et al. | |
| 2013/0027556 | A1* | 1/2013 | Clark | G08B 21/24 348/148 |
| 2013/0069795 | A1* | 3/2013 | Wenger | G01F 23/284 340/870.01 |
| 2013/0265155 | A1* | 10/2013 | Wible | G06Q 10/08 340/539.13 |
| 2015/0070187 | A1* | 3/2015 | Wiesner | A61B 5/0022 340/870.02 |
| 2015/0287308 | A1* | 10/2015 | Shuttleworth | G08B 13/08 340/693.1 |
| 2015/0374868 | A1* | 12/2015 | Bruce | A61L 2/208 422/3 |
| 2016/0223382 | A1 | 8/2016 | Luber | |
| 2017/0147975 | A1* | 5/2017 | Natarajan | B64C 39/024 |
| 2017/0265432 | A1* | 9/2017 | Anderton | G01S 5/02 |
| 2018/0025603 | A1* | 1/2018 | Tyler | G08B 13/2462 340/572.1 |
| 2018/0039314 | A1* | 2/2018 | Chennakeshu | G06F 1/3206 |
| 2018/0121643 | A1* | 5/2018 | Talwerdi | G06F 21/32 |
| 2019/0034855 | A1* | 1/2019 | Halioris | G06Q 10/063114 |

FOREIGN PATENT DOCUMENTS

| | | |
|---|---|---|
| DE | 10 2007 057 211 A1 | 5/2009 |
| DE | 10 2013 107 707 A1 | 1/2015 |
| EP | 2 028 625 A2 | 2/2009 |
| EP | 2 124 018 A1 | 11/2009 |
| WO | 02/05235 A1 | 1/2002 |
| WO | 2007/002407 A2 | 1/2007 |
| WO | 2009042640 A2 | 4/2009 |
| WO | 2009/065074 A2 | 5/2009 |
| WO | 2010/133980 A1 | 11/2010 |
| WO | 2013/022865 A1 | 2/2013 |
| WO | 2015/150487 A1 | 10/2015 |

OTHER PUBLICATIONS

European Search Report Corresponding to 16203734.5 dated May 19, 2017.

* cited by examiner

ELECTRONICS ASSEMBLY FOR WIRELESS TRANSMISSION OF AT LEAST ONE STATUS INFORMATION

The present invention relates to an electronics assembly for wireless transmission of at least one status information, to a container for transport and to a method for wireless transmission of at least one status information according to the preambles of the independent claims.

In many industries goods and materials are shipped in reusable containers. A supplier fills the container with the product to be shipped, which is then delivered to the customer. The customer takes the product out of the container, where appropriate over a certain period of time. Once the container is empty, it is shipped back to the supplier for refilling. Typically, some type of inventory control is used to manage and maintain a proper amount of each product in stock, in order to provide the required level of service at a minimum of cost. Such inventory control is often resource-intensive, requiring many manual processes on the side of the customer in order to maintain the supply needed for production or sale.

In order to improve inventory management, smart shipping containers have been developed, which allow the remote monitoring of their content. EP 2 028 625 A2 discloses a container with a telematics unit and a sensor unit that includes a set of sensors such as a liquid level sensor, a pressure sensor or a temperature sensor. The sensors are designed for determining status information of the container, such as its filling level. This information is transferred by a telematics unit to a telematics center. The supply of a certain good or material can therefore be monitored at the supplier's end, even when the shipping container is on the site of the customer. Hence, inventory management can be significantly improved, in particular in producing industries.

In the use of such a container, energy supply is critical. The device has to function autonomously for a prolonged period of time, sometimes even several months or years. In the above-mentioned reference, it was therefore proposed to operate the sensor and telematics unit in an energy-safe mode and to activate them only at previously defined time intervals. This way, the lifetime of the device's batteries can be improved.

However, with respect to the above-mentioned container, the time of autonomous operation is still not satisfying. It is therefore a problem underlying the present invention to overcome this problem in the state of the art. In particular, it is a problem underlying the present invention to provide an electronics assembly for wireless transmission of at least one status information of an object, in particular for a container for transport, which can be operated autonomously for a longer period of time.

This problem is solved by an electronics assembly, a container for transport and a method for wireless transmission according to the independent claims.

The electronics assembly for wireless transmission of at least one status information of an object comprises a motion sensor for detecting a movement of the object. Upon detection of a movement, the electronics assembly is set in a transport mode and upon detection of an absence of a movement, the electronics assembly is set in a stationary mode. The electronics assembly is configured such that the wireless transmission of the at least one status information is effected only in the stationary mode. This configuration allows for longer autonomous operation of the electronics assembly. In many cases, transmission of a certain kind of status information is not necessary during phases, in which an object is transported. Therefore, restricting the transmission of the status information to phases in which the object is stationary allows for reduction of the overall energy consumption, and therefore for longer autonomous operation.

The electronics assembly can be part of a system for determination and transmission of at least one status information of the object. Such a system can additionally comprise an energy storage for supplying the electronics assembly with energy.

Detection of a movement and setting the electronics assembly in the transport mode or the stationary mode can be undergone after a pre-defined time-interval, in particular depending on the electronics assembly being in the transport mode or stationary mode. For instance, detection of a movement can be undergone after 1 h, 6 h, 12 h, 24 h or 48 h, if the electronics assembly is in the transport mode, or 12 h, 24 h, 48 h or 96 h, if the electronics assembly is in the stationary mode.

The electronics assembly can comprise a cellular network module, in particular a GSM module. GSM (Global System for Mobile Communications) is a standard developed by the European Telecommunication Standards Institute (ETSI) to describe the protocols for second generation (G2) digital cellular networks used by mobile phones. It is the de facto global standard for mobile communications with over 90% market share, operating in over 219 countries and territories. Therefore, a cellular network module, in particular a GSM module, allows for reliable transmission of the status information at many places.

The electronics assembly can further comprise a positioning device, in particular a GPS receiver, for determining the position of the object as a status information for wireless transmission. GPS (Global Positioning System) is a global satellite navigation system that provides location and time information anywhere on or near the Earth's surface. The system was introduced and is operated by the US Department of Defense. GPS is not the only positioning system that can be used in the context of the present invention. Other systems are its European equivalent (Galileo), the Russian equivalent (GLONASS), the Chinese equivalent (BeiDou-2tf) or its Indian equivalent (IRNSS). All those satellite-based systems have the advantage, that they can establish the position of the object in a highly accurate manner (usually down to a range of a few meters) anywhere on Earth. On the other hand, in cases where the electronics assembly also comprises a cellular network module, in particular a GSM module, it is also possible to use the cellular network module for determining the position of the object. Although a cellular network module does not provide the same level of accuracy and coverage for positioning, this solution has the advantage that only one module is necessary for determination and transmission of the position. Furthermore, the cellular network module can be employed as an auxiliary system in cases where no satellite signal is available, for instance if the object is inside a building.

In the case of a container for goods or materials, determining position information has the advantage that it can be reliably established, if the container is on the supplier's site, the customer's site or in a intermediate storage facility. This allows for a further improvement of logistics.

The electronics assembly can be configured such that determination of the status information of the object, in particular its position, is only effected in the stationary mode. This way, the energy consumption of the electronics assembly can be further reduced as no status information is determined during transport. Accordingly, the time of autonomous operation of the electronics assembly can be improved.

On the other hand, it is also possible that the electronics assembly is configured such that determining the position of the object is only effected in the transport mode and, upon activation of the stationary mode, the last-determined position is transmitted. This configuration is particularly advantageous in cases where the object is transported into an environment where no positioning is possible, for instance into a building with no satellite signal, in cases where a satellite positioning device is used. The position can then be determined during transportation, when a satellite signal is usually available. When the object has reached its destination, the electronics assembly switches from the transport mode into the stationary mode and the last-determined position is transmitted, irrespective of the availability of a satellite signal.

The present invention further relates to a container for transport, in particular of a liquid, comprising an electronics assembly for wireless transmission of at least one status information, preferably an electronics assembly as described above. The container further comprises an energy storage for supplying the electronics assembly with energy. The energy storage is contained in a first primary housing, which is releasably attached to the container. The electronics assembly is contained in a separate second primary housing. This configuration with two separate primary housings for the energy storage and the electronics assembly allows for simple replacement of the energy storage when required.

The energy storage can be grouted in the first primary housing and/or the electronics assembly can be grouted in the second primary housing, in order to make the energy storage and/or the electronics assembly explosion proof. In an alternative embodiment, only part of the electronics assembly is grouted in the second primary housing. Other parts can then be grouted in other primary housings, if required. If the container is realized in an explosion proofed manner, it can be used in an explosive atmosphere, which is regularly encountered in chemical production plants. Grouting of electronic components is a particularly efficient and safe way to render electronic components explosion proof.

The first primary housing, and optionally also the second primary housing, can be releasibly attached to the container by a snap-on connection, in particular in the form of clips, preferably made of a plastic material. Such a connection further simplifies the replacement of the energy storage and, if required, also of the electronics assembly.

Both of the first and the second primary housings can be located in a secondary housing. A secondary housing can protect the primary housings from moisture, solvents, chemicals, dirt, or mechanical damage. Furthermore, it can help to give the container a better overall optical appearance.

The energy storage can be a battery, in particular a lithium-ion battery or a nickel-cadmium battery. Lithium-ion batteries have the advantage of a particularly high energy storage capacity and are therefore very suitable for the present application, where a relatively low electrical power is needed for a long period of time. Nickel-cadmium batteries have a lower storage capacity than lithium ion batteries, but can be produced at significantly lower costs, which makes them suitable for single use.

The energy transfer from the energy storage to the electronics assembly can be realized by means of a plug-in connection or inductively. A plug-in connection has the advantage, that it can be easily realized at low costs. However, due to the presence of electrical contacts, there is a risk that sparks are produced in case the connection is broken, which poses a considerable hazard in an explosive atmosphere. The plug-in connection would therefore have to be realized in an explosion-proof manner, if the container is to be used in an explosive atmosphere. An inductive connection has the advantage that no plugs have to be connected in order to connect the energy storage. However, an inductive connection is more cost-intensive and has the further drawback of power-loss in the course of energy transfer.

At least one of the first and the second primary housing can be mounted directly or indirectly on a holding frame, in particular in the form of a metal plate. This kind of mounting is robust.

The container can comprise a container body and the holding frame can be attached to the container body through a base plate, in particular in a bayonet-like connection. In case the same holding frame has to be attached to container bodies of different size, various base plates can be used, each fitted to the shape of a particular container body. This allows the use of a single holding frame and components attached to it in connection with container bodies of various sizes. Furthermore, the presence of a base plate allows for particularly secure connection of the holding frame to the container body. If a bayonet-like connection is employed, the holding frame can be readily attached and/or removed from the base plate.

The container can further comprise a filling level sensor, the filling level being a status information for wireless transmission. With a filling level sensor, the filling level of the container can be determined whenever required and transmitted by the electronics assembly to a telematics center. This way, constant monitoring of the filling level of the container is possible, even at the end of the supplier. The filling level sensor can be a hydrostatic pressure level sensor, a magnetostrictive level sensor or a float level sensor. These sensor types are particularly suitable to be used in connection with a container of the above-mentioned kind.

A hydrostatic pressure level sensor can comprise a first pressure sensor and a second pressure sensor, which are installed at opposite ends of a connecting tube. The hydrostatic pressure level sensor can be installed in a container body in such a way that the first pressure sensor is substantially at the bottom of the container body, whereas the second pressure sensor is substantially at the top. If the density of a fluid inside the container is known, the filling level can be calculated from the pressure difference measured by the first and second pressure sensor.

The first and/or the second pressure sensor can be attached to the connecting tube or to other parts of the hydrostatic pressure level sensor by a welding technique, in particular by laser welding. It has been found that the use of gaskets is not suitable for attaching pressure sensors to such a level sensor. On one hand, solvents or chemicals filled into the container can attack the gaskets. On the other hand, the large temperature rage of the contents of the container, typically in a range of −20° C. to 50° C. can harm the gaskets. Use of a welding technique is therefore a superior technique for attaching pressure sensor to the level sensor. In order to protect pressure sensors from mechanical damage, a protective cap can be mounted onto them.

A container with a filling level sensor can further comprise a display for indicating the filling level. This allows a user to directly read the filling level from the container without the need to have it transmitted first.

Independent of the presence of a filling level sensor, the display can be suitable to indicate other status information of the container, such as the pressure inside the container, the status of the energy storage or the status of the electronics assembly. The display can comprise a number of light-emitting diodes (LEDs) that function as a level indicator. The LEDs can also indicate status information as a sequence of flashes that ca be decoded by a user, if necessary with the help of a suitable table.

The container can comprise an operating element for the electronics assembly. This operating element can be used to control the display mode of the display. The operating element can be one or more Reed-switch(s). These have the advantage that they are well-suited to de used in an explosive atmosphere.

The container can comprise a container body with a container wall, wherein the container wall has an opening, in which the filling level sensor is mounted. An opening in the container has the advantage, that no other structures are necessary for mounting the filling level sensor. Furthermore, when filling level information is recorded inside the container, it can be transmitted to the electronics assembly in a straightforward manner by a cable connection through the opening.

Moreover, the base plate can be held by the portion of the filling level sensor outside the container body. This way, the electronics assembly can be mounted on the container body without further modification of the same.

The container can further comprise a transponder or a receiver, in particular an RFID-transponder or -receiver, for identification of the container and/or its content. This kind of identification is important to ensure that the right content is filled into or withdrawn from the container, in particular for verifying connection to the right transfer system, for instance in a chemical production plant.

The electronics assembly can be configured such that is activated, once the RFID-transponder or -receiver is used. Alternatively, it is also possible that the electronics assembly is set in the stationary mode, once the RFID-transponder or -receiver is used. This allows to initially trigger the transmission status information when the container is used for the first time.

The container can comprise a filling volume of 1 l to 2000 l, preferably of 10 l to 1500 l, more preferably of 20 l to 1000 l. Particularly, the container can comprise a filling volume of 10 l, 20, l, 30 l, 50 l, 185 l, 200 l, 400 l, 1000 l or 1400 l. These are filling levels that are particularly useful for the shipping of various liquids, in particular of liquid chemicals or solvents.

The container can comprise a container body of a metal or of a plastic material. Depending on the content to be transported, choice of the material can be crucial in order to avoid corrosion of the same.

The present invention further relates to a method for wireless transmission of at least one status information of an object with an electronics assembly, the method comprising the steps of:
  Providing a motion sensor and a wireless transmitter;
  Detecting a movement of the object;
  Setting the electronics assembly in a transport mode or a stationary mode, depending on the presence or absence of the movement;
  Wirelessly transmitting the at least one status information, only if the electronics assembly is in the stationary mode.

The status information can be a position of the object and the method can further comprise the step of determining the position of the object. On one hand, determining the position of the object can only be effected in the stationary mode. On the other hand, determining the position of the object can also only be effected in the transport mode and, upon activation of the stationary mode, the last determinate position can be transmitted.

As mention above in context of the electronics assembly, detection of a movement and setting the electronics assembly in the transport mode or the stationary mode can be undergone at predefined time-intervals.

By using such a method, the above-mentioned advantages discussed in connection with the electronics assembly are achieved.

However, without any particular connection to the above-described electronics assembly, the present invention generally refers to an electronics assembly configured for carrying out this method.

The present invention further refers to a container for transport, in particular of a liquid, preferably a container as described above, comprising an electronics assembly mentioned in the previous paragraph.

Further advantages and features of the present invention become apparent from the following description of an embodiment and from the drawings.

Figure 2:
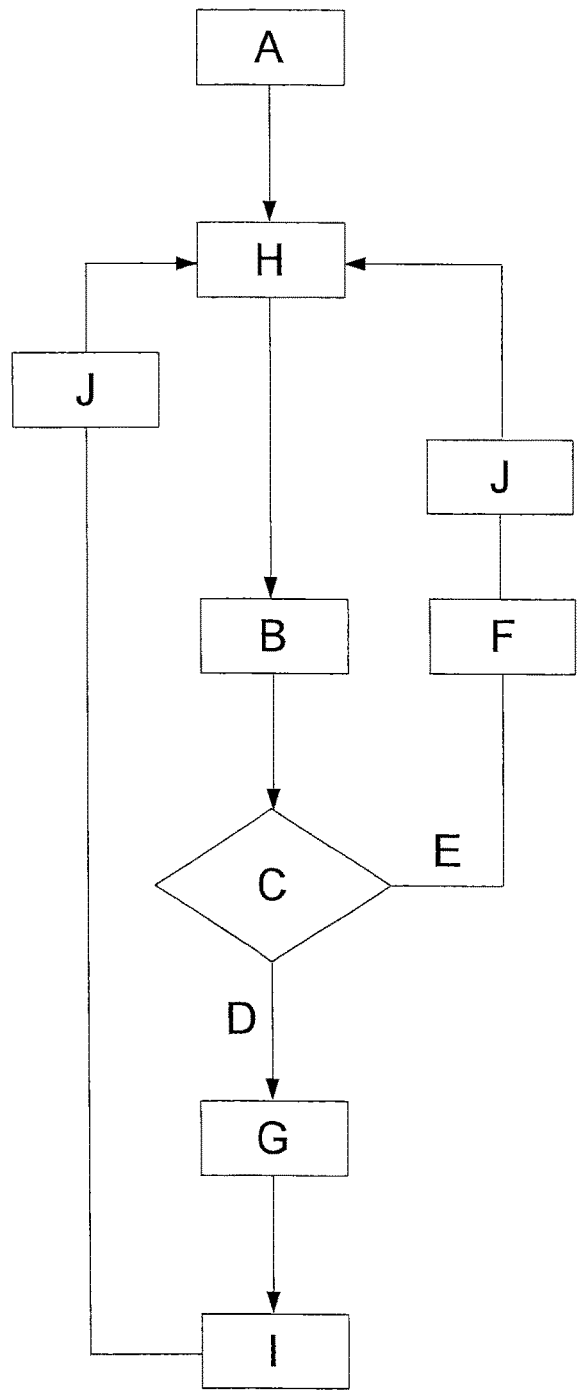
Figure 3:
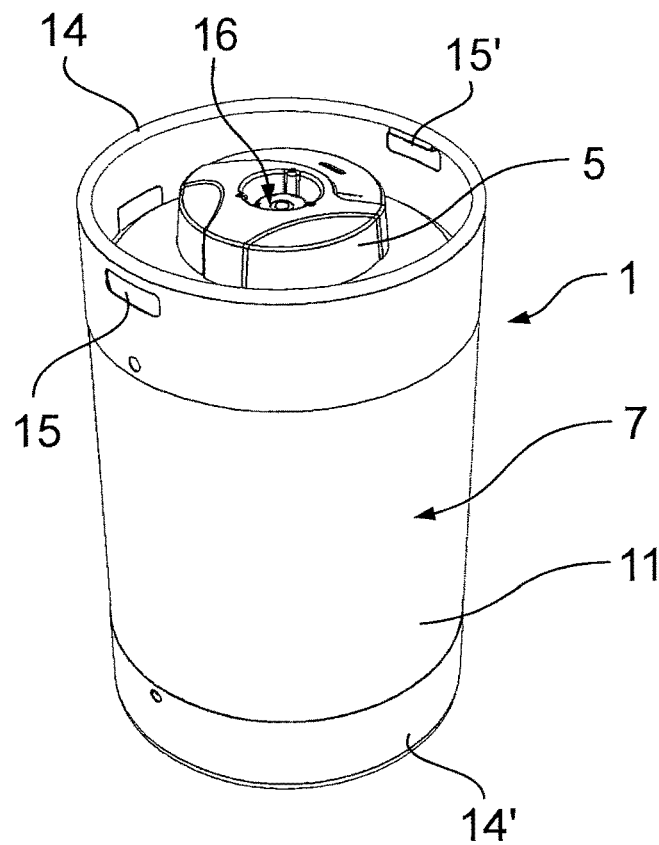
Figure 4:
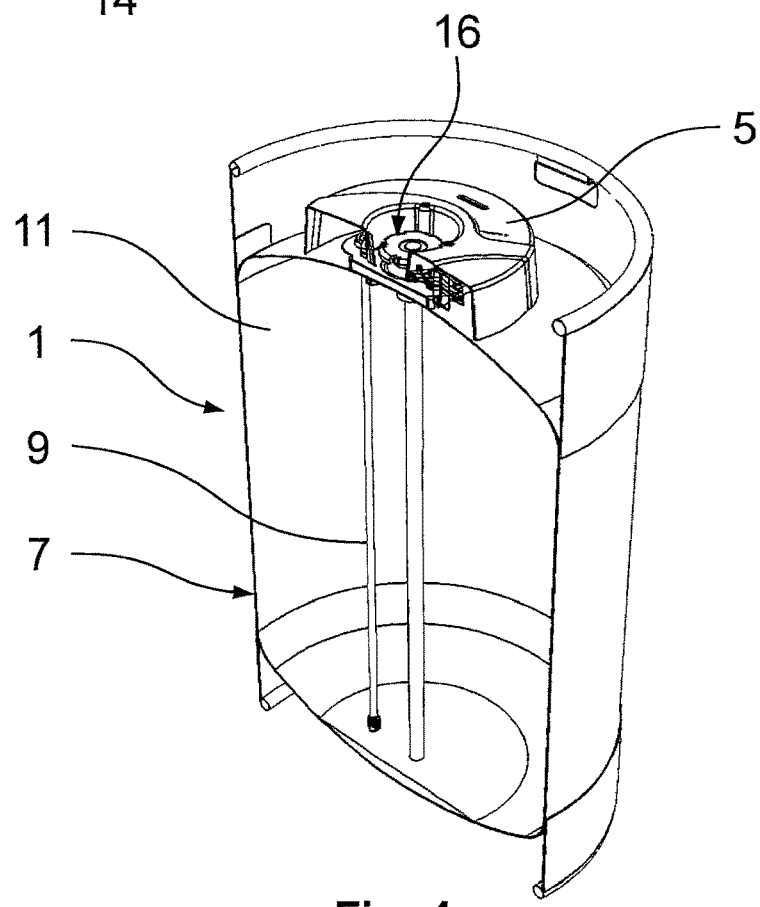
Figure 5:
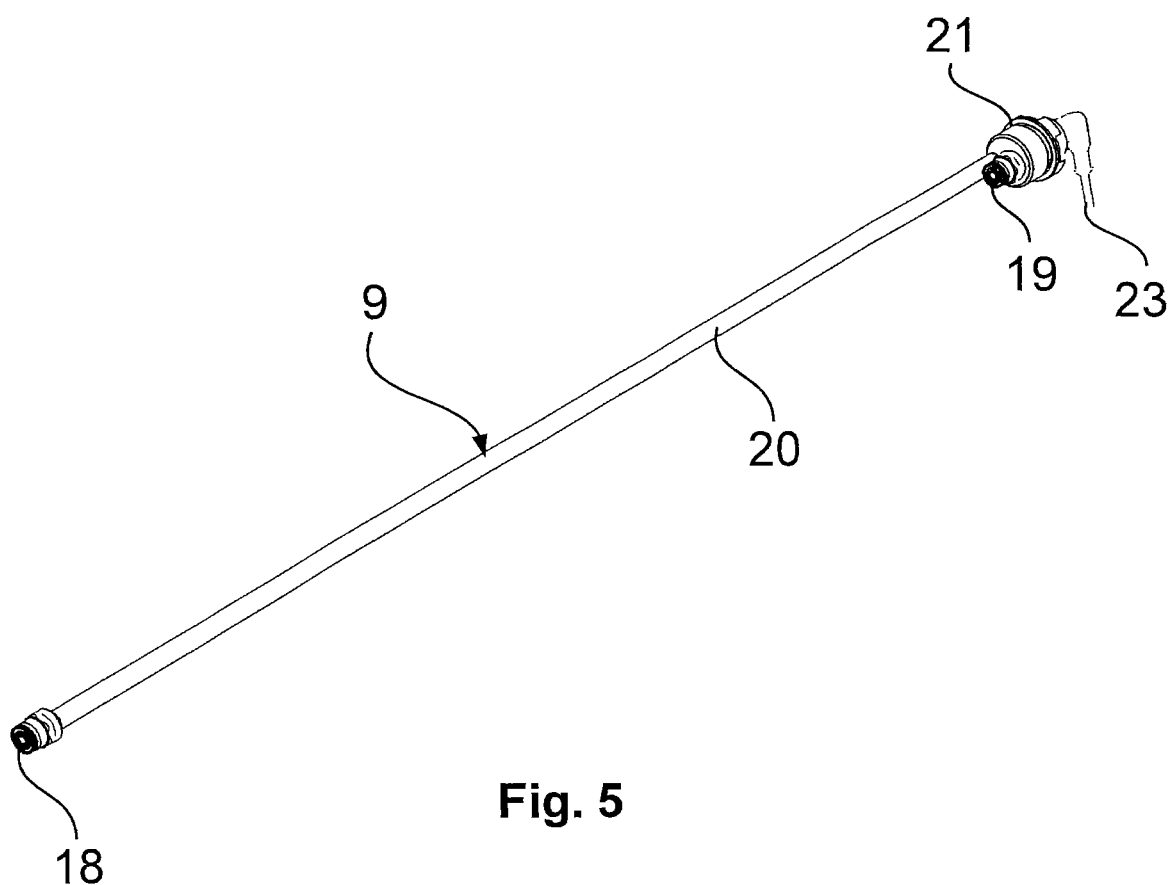
Figure 6:
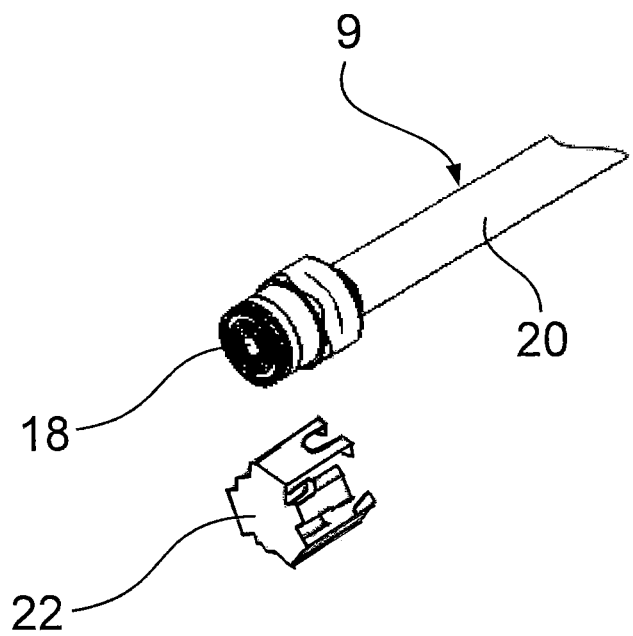
Figure 7:
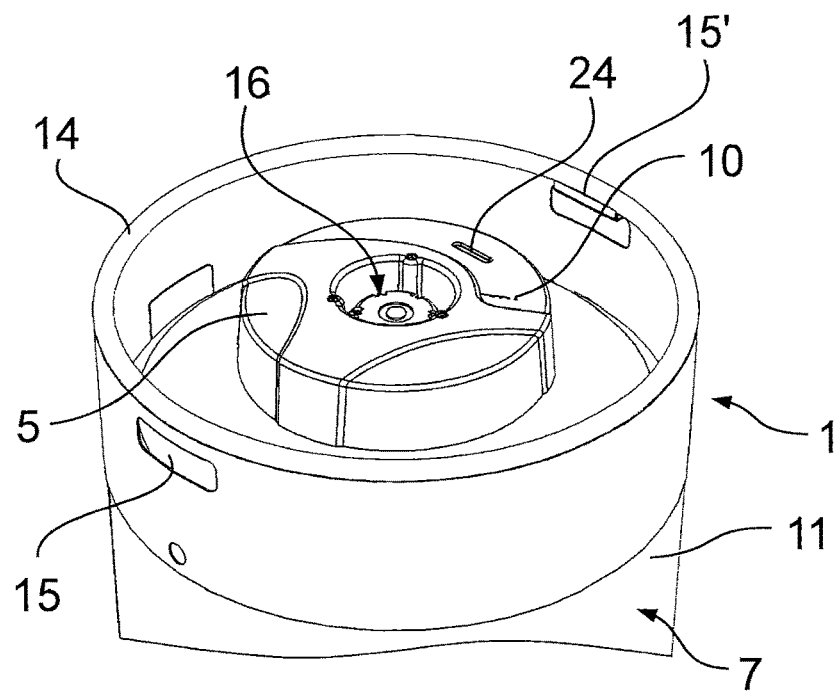
Figure 8:
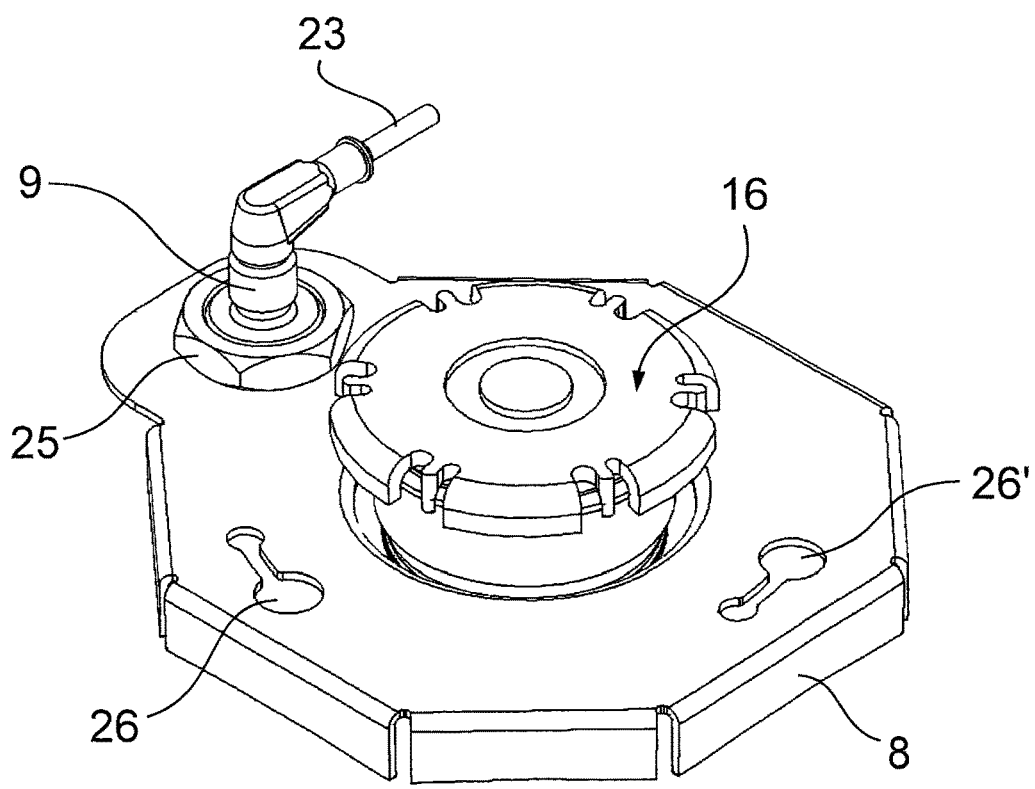
Figure 9:
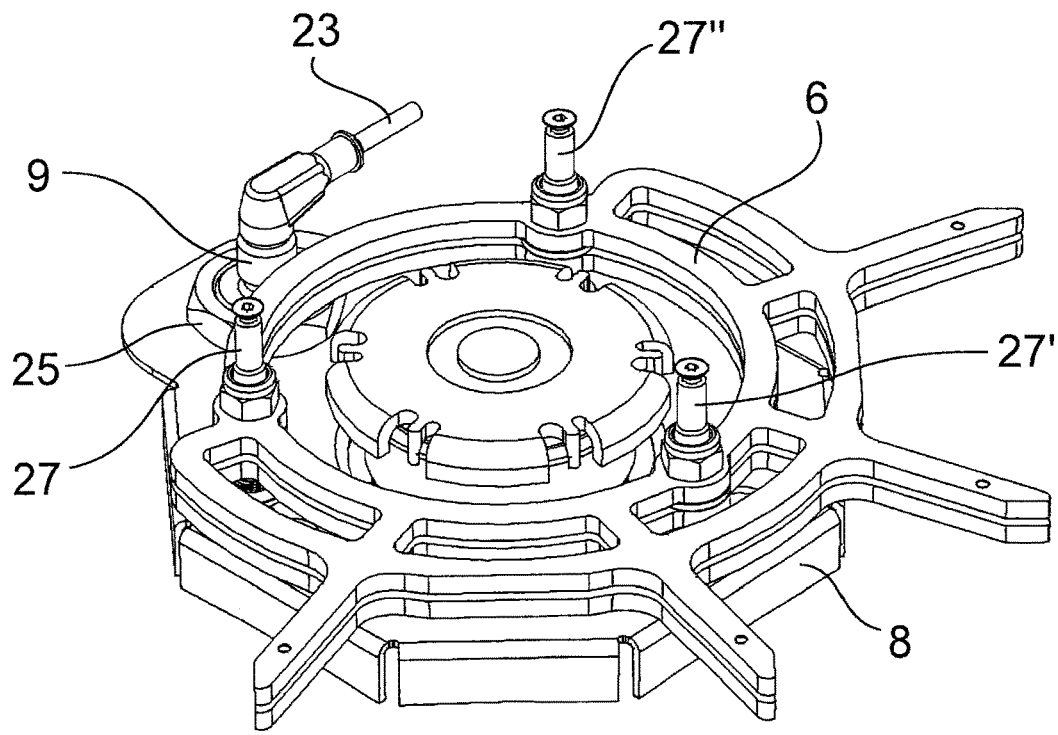
Figure 10:
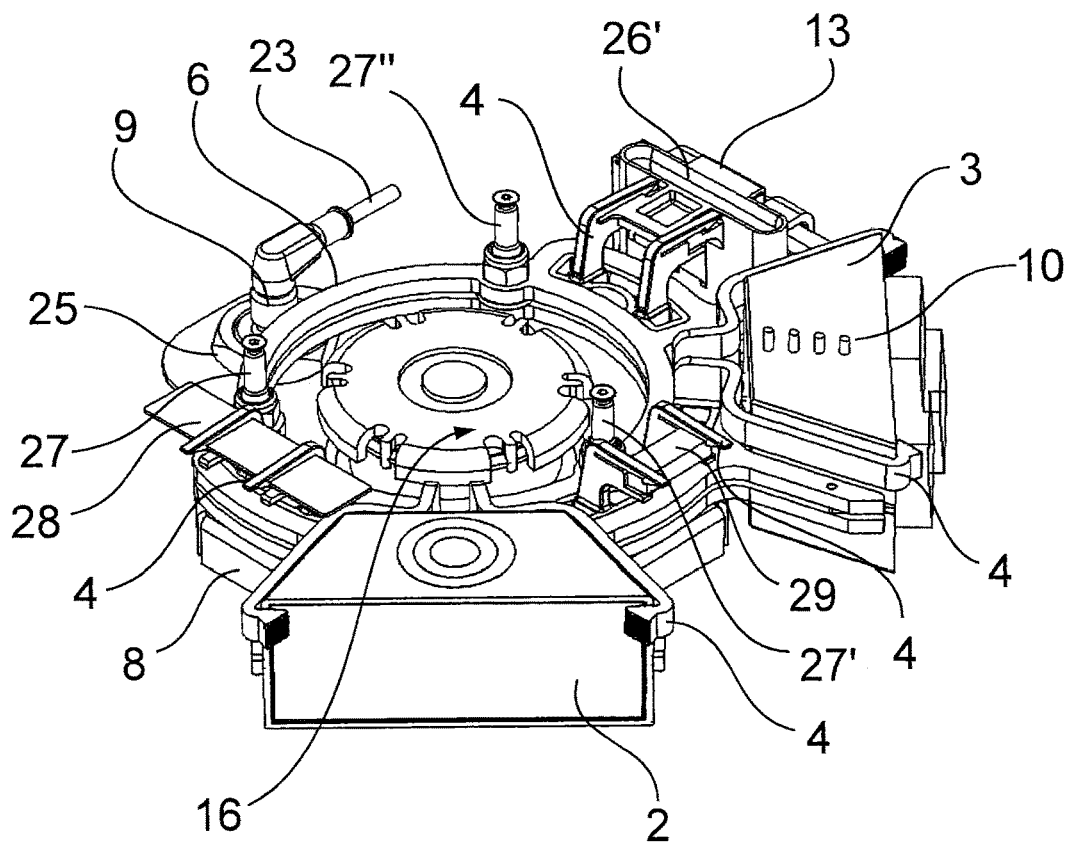

It is shown in
FIG. 1: Flow diagram of a first method according to the present invention;
FIG. 2: Flow diagram of a second method according to the present invention;
FIG. 3: Perspective view of a container according to the present invention;
FIG. 4: Perspective sectional view of a container according to the present invention;
FIG. 5: Perspective view of a hydrostatic filling level sensor for a container according to FIGS. 3 and 4;
FIG. 6: Detailed view of a portion of the hydrostatic filling level sensor according to FIG. 5;
FIG. 7: Enlarged representation of the top portion of a container according to FIGS. 3 and 5;
FIG. 8: Detailed view of a base plate of a container according to FIGS. 3 and 4;
FIG. 9: Detailed view of a holding frame of a container according to FIGS. 3 and 4;
FIG. 10: Detailed view of the system for determination and transmission of status information of a container according to FIGS. 3 and 4.

In FIGS. 1 and 2, items A-J have the following meaning:
A: Start;
B: Detect movement of the object;
C: Is movement present?
D: Yes;
E: No;
F: Set electronics assembly in transport mode;
G: Set electronics assembly in stationary mode;
H: Determine at least one status information of the object;
I: Wirelessly transmit at least one status information of the object;
J: Wait for a pre-defined period of time.

As apparent from FIG. 1, a first method according to the present invention commences with detecting a movement of the object. If a movement is detected, the electronics assembly is set in a transport mode and detection of a movement is repeated after a pre-defined period of time. If no movement is detected, the electronics assembly is set in a stationary mode, at least one status information of the object is determined and wirelessly transmitted. After a pre-defined period of time, detecting a movement of the object is then repeated. This method has the advantage that the energy consumption of the electronics assembly is particularly low, as status information of the object is only determined in the stationary mode. However, the method is not suitable, when the position of the object has to be determined based on a satellite navigation system and the object is stored at a place without satellite reception.

In an alternative embodiment of a method according to the present invention, at least one status information of the object is determined first. This status information is preferably the position of the object. Next, a movement of the object is detected. If a movement is detected, the electronics assembly is set in a transport mode and detection of a movement is repeated after a pre-defined period of time. If no movement is detected, the electronics assembly is set in a stationary mode and at least one status information is wirelessly transmitted. After a pre-defined period of time, detecting a movement of the object is then repeated. This method has the disadvantage that the energy consumption of the electronics assembly is slightly higher than in the method according to FIG. 1, as status information of the object is also determined in the transport mode. However, the method is also suitable, when the position of the object has to be determined based on a satellite navigation system and the object is stored at a place without satellite reception. In this case, the last-determined position information is transmitted.

According to FIG. 3, a container 1 according to the present invention can be in the shape of a barrel with a container body 7 and a rim region 14, 14' at the top and the bottom. The rim region 14, has handle-holes 15, 15'. In the middle of the top part of container 1, there is a connector 16 for filling and/or withdrawing of a liquid by a transfer system. The connector 16 is surrounded by a secondary housing 5, which contains a system for determination and transmission of at least one status information of the container. The container body 7 comprises a container wall 11. As apparent from FIG. 2, there is a withdrawal tube 17 inside the container body 7, which leads to the connector 16. Furthermore, there is a hydrostatic filling level sensor 9 extending parallel to the withdrawal tube 17.

FIGS. 5 and 6 show further details with respect to the hydrostatic filling level sensor 9. The sensor 9 comprises of a first pressure sensor 18, which is installed at the end of a connecting tube 20. A second pressure sensor 19 is installed at a connecting piece 21 at the opposite end of the connecting tube 20. A cable connection 23 connects the first pressure sensor 18 and the second pressure sensor 19 with the electronics assembly by cable connection 23. In order to protect the pressure sensors 18 and 19 against mechanic damage, a protective cap 22 can be mounted on each sensor 18, 19. The hydrostatic pressure level sensor 9 is installed in the container body 7 in such a way that the first pressure sensor 18 is substantially at the bottom of the container body, whereas the second pressure sensor 19 is substantially at the top. If the density of a fluid inside the container is known, the filling level can be calculated from the pressure difference measured by the first and second pressure sensor 18 and 19.

As can be seen in FIG. 7, the secondary housing 5 has on its top side a display 10 and a slot 24 for an RFID transponder. The display 10 allows to a user to read out different information about the container, such as its filling level, the battery state or other parameters of the electronics assembly. The slot 24 is designed to take up an RFID-transponder, in order to identify the container and/or its content. When in use, this allows to verify connection of the container to the right transfer system.

FIG. 8 shows further details on the attachment of the system for determination and transmission of at least one status information of the container. It can be seen that a base plate 8 is attached to the container body 7 by a screw-nut 25, which also holds the filling level sensor 9 in the respective opening. The base plate 8 comprises holes 26, 26' for attachment of the holding frame 6 through a bayonet-like connection. It is apparent from FIG. 7 that this is realized by attachment elements 27, 27', 27".

FIG. 10 shows the full system, which is normally covered by the secondary housing 5. The different components are attached to the holding frame 6 through plastic clips 4. The first primary housing 2 contains the energy storage, which can be either a lithium ion battery or a nickel-cadmium battery. The second primary housing 3 contains the electronics assembly. Both of the energy storage and the electronics assembly are contained in the first and second primary housing 2 and 3 in an explosion proof manner by grouting the components into the primary housings. The system further comprises an antenna 28 for wireless transmission of at least one status information of the container. In the present case, this antenna 28 is a GSM antenna. Furthermore, the system comprises a Reed-switch 29 for operating the electronics assembly. On top of the second primary housing 3 there is a display 10 for displaying various status information, such as the filling level or the status of the energy storage contained in the first primary housing 2. The display 10 comprises four LEDs in order to show this information to a user. The display mode can be controlled by operating the Reed-switch 29. Moreover, as mentioned above, the system comprises an RFID-reader 13.

The invention claimed is:

1. A container for transport, comprising:
an electronics assembly for wireless transmission of at least one status information and an energy storage for supplying the electronics assembly with energy,
wherein, the energy storage is contained in a first primary housing, which is releasably attached to the container, and the electronics assembly is contained in a separate second primary housing,
the electronics assembly comprises a motion sensor for detecting a movement and a filling level sensor for determining the filling level of the container, the electronics assembly is configured to work in a transportation mode, upon detection of a movement by the motion sensor, and in a stationary mode, upon detection of an absence of movement by the motion sensor,
a first status information encompasses position information, at least another status information encompasses a filling level, the filling level sensor is configured such that the filling level of the container can be determined independent of the detection of movement by the motion sensor so that the filling level sensor constantly determines the filling level,
the electronics assembly is configured such that the wireless transmission of the position information is effected only if the absence of movement is detected by the motion sensor and the wireless transmission of the filling level information is effected upon the determination of a change in the filling level by the filling level sensor such that the transmission of the position information of the container is restricted to phases in which the object is stationary and the transmission of the filling level is independent from the movement status of the container.

2. The container according to claim 1, wherein at least one of the energy storage is grouted in the first primary housing and the electronics assembly is grouted the second primary housing, in order to make at least one of the energy storage and the electronics assembly explosion-proof.

3. The container according to claim 1, wherein both of the first and the second primary housing are located in a secondary housing.

4. The container according claim 1, further comprising a filling level sensor, and the filling level being a status information for wireless transmission.

5. The container according to claim 1, further comprising a transponder or a receiver for identification of at least one of the container and its content.

* * * * *